2,513,436

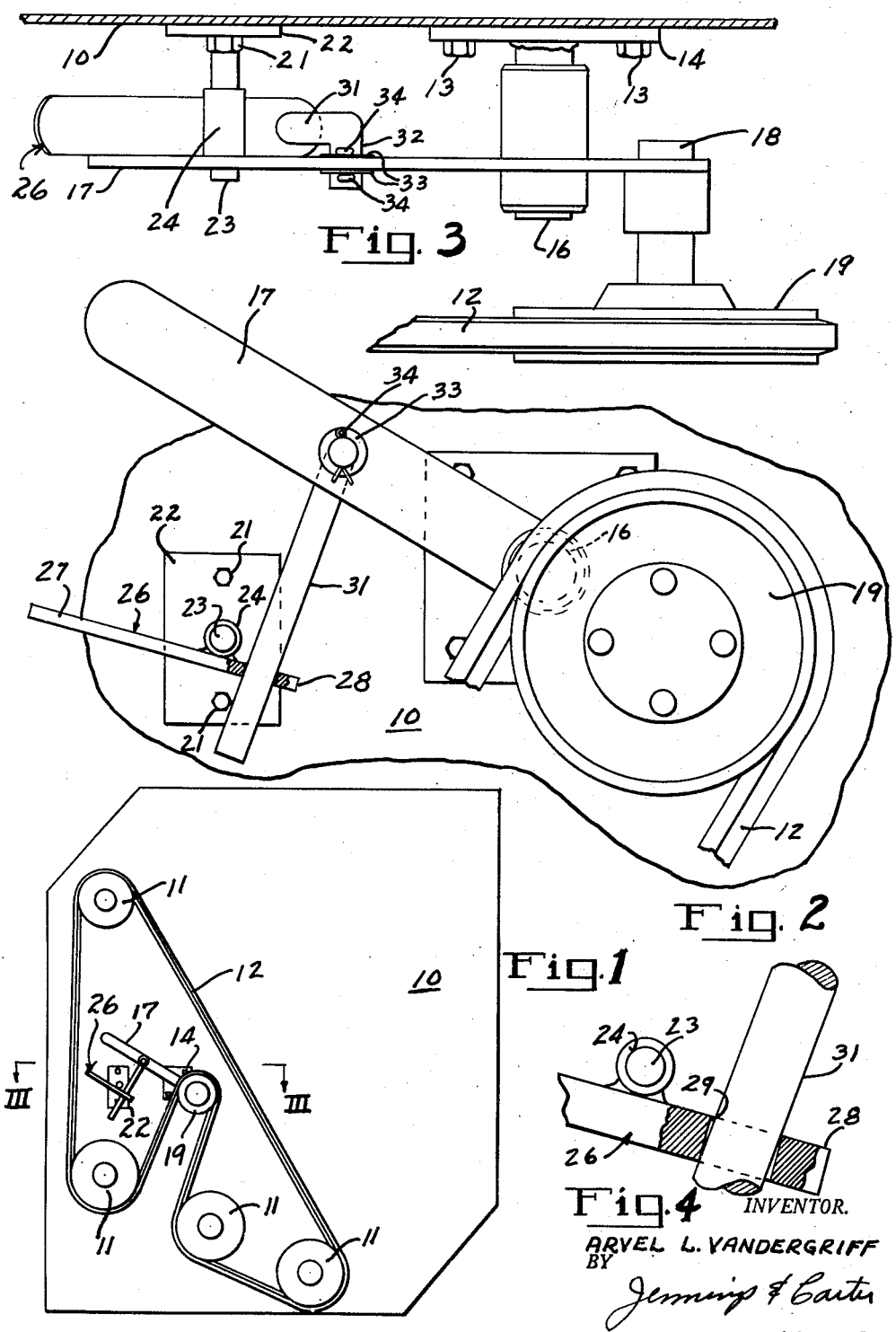
July 4, 1950 — A. L. VANDERGRIFF — 2,513,436
BELT TIGHTENER
Filed June 29, 1949
INVENTOR.
ARVEL L. VANDERGRIFF
BY Jennings & Carter
ATTORNEYS Patented July 4, 1950

UNITED STATES PATENT OFFICE 2,513,436

BELT TIGHTENER

Arvel L. Vandergriff, Columbus, Ga., assignor to Lummus Cotton Gin Company, a corporation of Georgia Application June 29, 1949, Serial No. 101,931

4 Claims. (Cl. 74—242.1)

My present invention relates to belt tighteners and the like, and has for an object the provision of a simple yet effective mechanism for holding a belt tight, and one in which the belt may be easily and quickly loosened or tightened.

Another object of my invention is to provide a belt tightener in which an idler pulley is carried on the end of a pivotally mounted arm, and in which the pulley is held in contact with the belt by means of a pivoted rod passing through a hole in a pivotally mounted holder, the parts being so assembled that when the rod and holder are disposed at 90 degrees to one another the rod may slide freely in the hole, and when the holder is released it rocks about its pivot point, thereby to bind against the rod and prevent its withdrawal, holding the belt tight.

A belt tightener illustrating the features of my invention is shown in the accompanying drawing forming a part of this application in which:

Fig. 1 is a side elevational view of a piece of apparatus embodying a series of pulleys over which a belt is passed, and showing my invention associated therewith;

Fig. 2 is an enlarged side elevational view, partly broken away and in section, and showing my improved tightener holding a belt tight;

Fig. 3 is a detailed sectional view taken along line III—III of Fig 1 and drawn to an enlarged scale; and Fig. 4 is a diagrammatic, enlarged sectional view illustrating the binding action of the pivoted holder on the rod passing therethrough.

Referring now to the drawing for a better understanding of my invention, I illustrate the same in association with a piece of machinery embodying a housing 10 and having a plurality of pulleys 11 on the side thereof over which is trained a V-belt 12. Mounted on the side of the housing 10 by means of studs 13 is a bracket 14 carrying an outstanding stub shaft 16. Pivotally mounted on the shaft for movement in a vertical plane is an arm 17. On one end of arm 17 is a shaft 18 carrying an idler pulley 19.

Mounted on the side of the housing 10 by means of studs 21 is a bracket 22 carrying an outstanding pin 23. Pivotally mounted about the pin 23 is a sleeve 24, and secured to the sleeve as by welding thereto is a bar 26. The bar 26 has a longer end 27, and a shorter end 28, when considering its point of attachment to the sleeve 24, and is mounted to rock in substantially the same vertical plane as is the arm 17. In the shorter end 28 I provide an opening 29. Passing loosely through the opening 29 is the lower end of a round rod 31. The rod 31 is bent over at its upper end 32, and is pivotally mounted in an opening provided therefor intermediate the end of the arm 17 and the shaft 16. The end 32 of the rod 31 may be held in place by means of washers 33 and cotter pins 34.

From the foregoing the method of constructing and using my improved belt tightener may be readily explained and understood. With the parts assembled in the relation shown in the drawing, the idler pulley 19 having the belt 12 trained thereover may be moved upwardly as viewed in Figs. 1 and 2 of the drawing by grasping the outer end of arm 17 and pulling the same down. Since the handle end 27 of bar 26 overhangs the pivot point 23 more than the end 28, downward movement of pin 31 causes the opening 29 to become aligned with the pin, permitting the pin to slide therethrough. Upon releasing the handle 27 of the bar 26, the bar rocks about the pin 23 due to the weight of the end 27 thereof, thus bringing the upper and lower edges of the opening 29 into binding contact with the rod 31. The tightened belt tends to rock the arm 17 clockwise as viewed in Fig. 2, causing the bar 26 to bind tightly about the rod 31. The pulley 19 is thus held raised to the selected tightness of the belt. In order to release the same it is only necessary to raise upwardly slightly on the handle 27, bring the rod 31 and bar 26 normal to each other, centering or aligning the hole 29 with respect to the pin 31, permitting the pin to slide freely through the hole.

From the foregoing it will be apparent that I have devised an improved belt tightener which is simple of construction and operation. My invention is particularly useful in those cases wherein it is desired to frequently tighten or loosen a belt, and particularly useful wherein the time involved in loosening and retightening a belt is a material factor. In actual operation I have found that my improved belt tightener is satisfactory in every way, and that it is not subject to becoming loosened due to vibration of the machine on which it is installed. The parts are simple of construction, free of wear, and positive in operation. While I have shown and described the pin 31 and opening 29 as being round, it will be apparent that other forms of pins and openings may be used if desired.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a belt tightener or the like, a pivoted arm carrying adjacent one end a pulley over which is trained the belt to be tightened, a pin pivotally mounted to the arm on the opposite side of the pivot point thereof from the pulley and between the pivot point for the arm and the other end of the arm, and a pivotally mounted member having an opening therein of a size to pass the pin when the opening is axially aligned with the pin and to bind about the pin when the opening is out of axial alignment therewith.

2. In a belt tightener, an arm pivotally mounted intermediate its ends, a pulley rotatably mounted on the arm on one side of the pivot point thereof, a pin pivotally mounted to the arm on the opposite side of the arm pivot point, and a locking member in the form of a pivotally mounted flat bar having an opening therein through which the pin passes, said opening being of a size to freely pass the pin when the flat bar is normal to the pin and for the walls thereof to bind about the pin when the flat bar is out of 90° relation with respect to the side walls of said opening.

3. In a belt tightener, an arm pivotally mounted intermediate its ends, a pulley rotatably mounted adjacent one end of the arm, a pin pivotally mounted to the arm on the other side of the pivot point thereof, a pivotally mounted member having an opening therein through which the pin passes, said opening being of a size to freely pass said pin when axially aligned therewith and for the side walls thereof to bind against the pin when the opening is out of axial alignment therewith, and extensions on said arm and pivoted member forming handles for rocking the same about their pivot points.

4. In a belt tightener, an arm pivotally mounted intermediate its ends for movement in a vertical plane, an idler pulley adjacent one end of said arm over which is trained the belt to be tightened, a bar disposed beneath the arm and mounted intermediate its ends for pivotal movement in substantially the same vertical plane occupied by the arm, a pin pivoted to the arm on the side of the pivot point thereof opposite the pulley, there being an opening in the bar on one side of its pivot point of a size to freely pass the pin when the opening is axially aligned with the pin and of a size for the walls thereof to bind about the pin when the opening is out of alignment therewith, an extension on said bar on the side of the pivot point thereof opposite the opening and overbalancing said bar about its pivot point, and an extension on the arm on the side of the pivot point thereof outwardly of the point of connection therewith of said pin.

ARVEL L. VANDERGRIFF.

REFERENCES CITED

The following references are of record in the file of this patent:

UNITED STATES PATENTS

| Number | Name | Date |
| --- | --- | --- |
| 1,188,810 | Mitchell | June 27, 1916 |
| 1,978,526 | Eppler, Jr. | Oct. 30, 1934 |